(12) United States Patent
Lee et al.

(10) Patent No.: US 10,485,021 B2
(45) Date of Patent: Nov. 19, 2019

(54) METHOD AND APPARATUS FOR CONTROLLING INTERFERENCE IN WIRELESS COMMUNICATION SYSTEM

(71) Applicant: Samsung Electronics Co., Ltd., Gyeonggi-do (KR)

(72) Inventors: Hyojin Lee, Gyeonggi-do (KR); Younsun Kim, Gyeonggi-do (KR); Yongjun Kwak, Gyeonggi-do (KR); Youngbum Kim, Seoul (KR); Juho Lee, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/200,445

(22) Filed: Mar. 7, 2014

(65) Prior Publication Data
US 2014/0254516 A1 Sep. 11, 2014

(30) Foreign Application Priority Data

Mar. 7, 2013 (KR) .................. 10-2013-0024601

(51) Int. Cl.
*H04W 74/00* (2009.01)
*H04L 5/00* (2006.01)
(Continued)

(52) U.S. Cl.
CPC ......... *H04W 74/002* (2013.01); *H04L 5/0016* (2013.01); *H04L 5/0051* (2013.01);
(Continued)

(58) Field of Classification Search
CPC ... H04L 5/0051; H04L 5/0073; H04L 5/0092; H04L 27/2613; H04L 1/0025; H04L 5/0048; H04L 5/0016; H04L 27/2602
(Continued)

(56) References Cited

U.S. PATENT DOCUMENTS 6,718,162 B1    4/2004  Agin et al.
9,385,819 B2 *  7/2016  Yoshimoto ............. H04W 8/24
(Continued)

FOREIGN PATENT DOCUMENTS

CN      1321016        11/2001
CN      101820670      9/2010
(Continued)

OTHER PUBLICATIONS

Chinese Office Action dated Jun. 16, 2017 issued in counterpart application No. 201480012443.0, 21 pages.
(Continued)

*Primary Examiner* — John D Blanton
*Assistant Examiner* — Jean F Voltaire
(74) *Attorney, Agent, or Firm* — The Farrell Law Firm, P.C.

(57) ABSTRACT

A method and apparatus for transmitting control information is provided for use in detection of interference an signal in a wireless communication system. An interference control method of a base station of a mobile communication system includes scheduling data to be transmitted to a terminal and transmitting control information including data channel information on the scheduled data and interference signal information to the terminal.

12 Claims, 15 Drawing Sheets

(51) Int. Cl.
*H04L 27/26* (2006.01)
*H04L 1/00* (2006.01)

(52) U.S. Cl.
CPC .......... *H04L 5/0092* (2013.01); *H04L 1/0025* (2013.01); *H04L 5/0048* (2013.01); *H04L 5/0073* (2013.01); *H04L 27/2602* (2013.01); *H04L 27/2613* (2013.01)

(58) Field of Classification Search
USPC ........................................................ 370/329
See application file for complete search history.

(56) References Cited

U.S. PATENT DOCUMENTS

| | | | |
|---|---|---|---|
| 2004/0131029 A1* | 7/2004 | Tobe | H04M 15/8016 370/331 |
| 2010/0222003 A1* | 9/2010 | Yoshii | H04W 72/082 455/63.3 |
| 2010/0309865 A1 | 12/2010 | Kimura | |
| 2012/0051319 A1* | 3/2012 | Kwon | H04W 72/0406 370/329 |
| 2012/0106465 A1 | 5/2012 | Haghighat et al. | |
| 2012/0322492 A1* | 12/2012 | Koo | H04B 7/0417 455/517 |
| 2013/0163518 A1 | 6/2013 | Dateki | |
| 2013/0281107 A1 | 10/2013 | Uemura et al. | |
| 2013/0301542 A1* | 11/2013 | Krishnamurthy et al. | ... 370/329 |
| 2013/0343215 A1 | 12/2013 | Li et al. | |
| 2014/0018062 A1* | 1/2014 | Ito | 455/422.1 |
| 2014/0169323 A1* | 6/2014 | Park et al. | 370/329 |
| 2014/0198763 A1* | 7/2014 | Sorrentino | H04B 7/024 370/330 |
| 2014/0213269 A1* | 7/2014 | Nama et al. | 455/451 |
| 2015/0365154 A1* | 12/2015 | Davydov | H04B 7/024 370/329 |
| 2016/0007328 A1 | 1/2016 | Lee et al. | |

FOREIGN PATENT DOCUMENTS

| | | | |
|---|---|---|---|
| CN | 102282892 | 12/2011 | |
| EP | 1 143 630 | 10/2001 | |
| EP | 2 229 031 | 9/2010 | |
| EP | 2229031 A1 * | 9/2010 | ........ H04W 52/0206 |
| EP | 2229031 A1 * | 9/2010 | ........ H04W 52/0206 |
| JP | 2010-283698 | 12/2010 | |
| KR | 1020110098592 | 9/2011 | |
| WO | WO 2012/035626 | 3/2012 | |
| WO | WO 2012/075387 | 6/2012 | |

OTHER PUBLICATIONS

Chinese Office Action dated Jan. 17, 2018 issued in counterpart application No. 201480012443.0, 17 pages.
European Search Report dated Jun. 19, 2015 issued in counterpart application No. 14158343.5-1505, 7 pages.
InterDigital Communications, LLC, "Discussion on Transparency of LTE-A MU-MIMO", R1-102091, 3GPP TSG RAN WG1 #60bis, Apr. 12-16, 2010, 8 pages.
ZTE, "Network Assistance Signalling for NAICS", R1-140267, 3GPP TSG RAN WG1 Meeting #76, Feb. 10-14, 2014, 4 pages.

* cited by examiner

METHOD AND APPARATUS FOR CONTROLLING INTERFERENCE IN WIRELESS COMMUNICATION SYSTEM

PRIORITY

This application claims priority under 35 U.S.C. § 119(a) to a Korean Patent Application filed on Mar. 7, 2013 in the Korean Intellectual Property Office and assigned Serial No. 10-2013-0024601, the entire disclosure of which is incorporated herein by reference.

BACKGROUND

1. Field of the Invention

The present invention generally relates to a method and apparatus for controlling interference in a wireless communication system, and more particularly, the present invention relates to a method and apparatus for transmitting control information for use in detection of interference signals in a wireless communication system.

2. Description of the Related Art

The mobile communication system has evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16 defined in IEEE, have been developed to support the high-speed, high-quality wireless packet data communication services. Particularly, LTE is a communication standard developed to support high speed packet data transmission and to maximize the throughput of the radio communication system with various radio access technologies. LTE-A is the evolved version of LTE to improve the data transmission capability.

Typically, LTE base stations and terminals are based on 3GPP Release 8 or 9 while LTE-A base stations and terminals are based on 3GPP Release 10. The 3GPP standard organization is specifying the next release for more improved performance beyond LTE-A.

The existing $3^{rd}$ and $4^{th}$ generation wireless packet data communication systems (such as HSDPA, HSUPA, HRPD, and LTE/LTE-A) adopt Adaptive Modulation and Coding (AMC) and Channel-Sensitive Scheduling techniques to improve transmission efficiency. AMC allows the transmitter to adjust the data amount to be transmitted according to the channel condition. That is, the transmitter is capable of decreasing the data transmission amount for a bad channel condition so as to fix the received signal error probability at a certain level, or increasing the data transmission amount for a good channel condition so as to transmit a large amount of information efficiently while maintaining the received signal error probability at an intended level. Meanwhile, the Channel Sensitive-Scheduling allows the transmitter to serve the user having a good channel condition selectively among a plurality of users so as to increase the system capacity as compared to allocating a channel fixedly to serve a single user. This increase in system capacity is referred to as multi-user diversity gain. Both the AMC and Channel Sensitive-Scheduling are methods of adopting the best modulation and coding scheme at the most efficient time based on partial channel state information feedback from the receiver.

In case of using AMC along with a Multiple Input Multiple Output (MIMO) transmission scheme, it may be necessary to take into consideration a number of spatial layers and ranks for transmitting signals. In this case, the transmitter determines the optimal data rate in consideration of the number of layers for use in MIMO transmission.

The MIMO system which transmits radio signals using a plurality of transmit antennas can be classified into one of Single-User MIMO (SU-MIMO) for allocating one time-frequency resources to a single user and a Multi-User MIMO (MU-MIMO) for allocating one time-frequency resources to multiple users through spatial multiplexing. In the case of SU-MIMO, a radio signal addressed to a receiver is transmitted from a plurality transmit antennas on a plurality of spatial layers. At this time, the receiver has to have a plurality of receive antennas for receiving the signal transmitted on the plural spatial layers correctly. Compared to the SU-MIMO, the MU-MIMO is advantageous in that there is no need for the receiver to have multiple receive antennas. However, the MU-MIMO has a drawback in that the radio signals transmitted to different receivers on the same time-frequency resource are likely to interfere to each other.

Recently, a great deal of research is being conducted to replace Code Division Multiple Access (CDMA) used in the legacy $2^{nd}$ and $3^{rd}$ mobile communication systems with Orthogonal Frequency Division Multiple Access (OFDMA) for the next generation mobile communication system. The 3GPP and 3GPP2 are in the middle of the standardization of an OFDMA-based evolved system. OFDMA is expected to provide superior system throughput as compared to CDMA. One of the main factors that allow OFDMA to increase system throughput is the frequency domain scheduling capability. As Channel Sensitive-Scheduling increases the system capacity using the time-varying channel characteristic, OFDM can be used to obtain more capacity gain using the frequency-varying channel characteristic.

FIG. 1 is a graph illustrating a relationship between time and frequency resources in LTE/LTE-A system.

As shown in FIG. 1, the radio resource for transmission from the evolved Node B (eNB) to a User Equipment (UE) is divided into Resource Blocks (RBs) 110 in the frequency domain and subframes 120 in the time domain. In the LTE/LTE-A system, an RB consists of 12 consecutive carriers and occupies 180 kHz bandwidth in general. Meanwhile, a subframe consists of 14 OFDM symbols and spans 1 msec. The LTE/LTE-A system allocates resources for scheduling in units of subframes in the time domain and in units of RBs in the frequency domain.

FIG. 2 is a time-frequency grid illustrating a single resource block of a downlink subframe as a smallest scheduling unit in the LTE/LTE-A system.

As shown in FIG. 2, the radio resource is of one subframe 210 in the time domain and one RB 220 in the frequency domain. The radio resource consists of 12 subcarriers in the frequency domain and 14 OFDM symbols in the time domain, i.e. 168 unique frequency-time positions. In LTE/LTE-A, each frequency-time position is referred to as Resource Element (RE). One subframe consists of two slots, and each slot consists of 7 OFDM symbols.

The radio resource structured as shown in FIG. 2 can be used for transmitting plural different types of signals as follows.

1. CRS (Cell-specific Reference Signal) 230: reference signal transmitted to all the UEs within a cell
2. DMRS (DeModulation Reference Signal) 240: reference signal transmitted to a specific UE
3. PDSCH (Physical Downlink Shared CHannel) 250: data channel transmitted in downlink which the eNB uses to transmit data to the UE and mapped to REs not used for reference signal transmission in the data region of FIG. 2
4. CSI-RS (Channel Status Information Reference Signal) 270: reference signal transmitted to the UEs within a cell and used for channel state measurement. Multiple CSI-RSs can be transmitted within a cell.
5. Other control channels (PHICH, PCFICH, PDCCH) 260: channels for providing control channels necessary for the UE to receive a PDCCH (Physical Downlink Control CHannel) and transmitting ACK/NACK of HARQ (Hybrid Automatic Repeat reQuest) operation for uplink data transmission In addition to the above signals, muting may be configured in order for the UEs within the corresponding cells to receive the CSI-RSs transmitted by different eNBs in the LTE-A system. The muting can be mapped to the positions designated for CSI-RS, and the UE receives the traffic signal skipping the corresponding radio resource in general. In the LTE-A system, muting is referred to as zero power CSI-RS (ZP CSI-RS). The muting by nature is mapped to the CSI-RS position 270 without transmission power allocation.

In FIG. 2, the CSI-RS 270 can be transmitted at some of the positions marked by A, B, C, D, E, F, G, H, I, and J according to the number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, the entire of the specific pattern is used for CSI-RS transmission; and for eight antenna ports, two patterns are used for CSI-RS transmission. Meanwhile, muting is always performed by pattern. That is, although the muting may be applied to plural patterns, if the muting positions mismatch CSI-RS positions, it cannot be applied to one pattern partially.

In a cellular system, the reference signal has to be transmitted for downlink channel state measurement. In the case of the 3GPP LTE-A system, the UE measures the channel state with the eNB using the CSI-RS transmitted by the eNB. The channel state is measured in consideration of a few factors including downlink interference. The downlink interference includes the interference caused by the antennas of neighbor eNBs and thermal noise that are important in determining the downlink channel condition. For example, in the case where the eNB with one transmit antenna transmits the reference signal to the UE with one receive antenna, the UE has to determine energy per symbol that can be received in the downlink and the interference amount that may be received for the duration of receiving the corresponding symbol to acquire Signal to Noise plus Interference Ratio (SNIR). The SNIR is the value obtained by dividing the received signal power by interference and noise signal strength. Typically, the higher the SNIR is, the better the reception performance is and the higher the data rate is. The determined SNIR or corresponding value, or the maximum data rate supportable at the SNIR is reported to the base station for use in determining the downlink data rate. In the conventional technology, however, information on the RS as an interference signal is not exchanged, resulting in failure of efficient interference cancellation.

SUMMARY

The present invention has been made to address at least the above described problems and disadvantages, and to provide at least the advantages described below.

Accordingly, an aspect of the present invention provides an interference control method and apparatus of a UE that is capable of cancelling interference based on interference-related control information provided by the network in a cellular mobile communication system, particularly an LTE-A system.

In accordance with an aspect of the present invention, an interference control method of a base station of a mobile communication system is provided. The interference control method includes scheduling data to be transmitted to a terminal, and transmitting control information including data channel information on the scheduled data and interference signal information to the terminal.

In accordance with another aspect of the present invention, an interference control method of a terminal in a wireless communication system is provided. The interference control method includes receiving control information including information on a data channel scheduled for the terminal and interference signal information from a base station, and performing interference control based on the interference signal information.

In accordance with another aspect of the present invention, a base station for controlling interference in a mobile communication system is provided. The base station includes a transceiver which transmits and receives signals to and from a terminal, and a controller which controls scheduling data to be transmitted to a terminal and transmitting control information including data channel information on the scheduled data and interference signal information to the terminal.

In accordance with still another aspect of the present invention, a terminal for controlling interference in a mobile communication system is provided. The terminal includes a transceiver which transmits and receives signals to and from a base station, and a controller which controls receiving control information including information on a data channel scheduled for the terminal and interference signal information from a base station and performing interference control based on the interference signal information.

BRIEF DESCRIPTION OF THE DRAWINGS

The foregoing and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
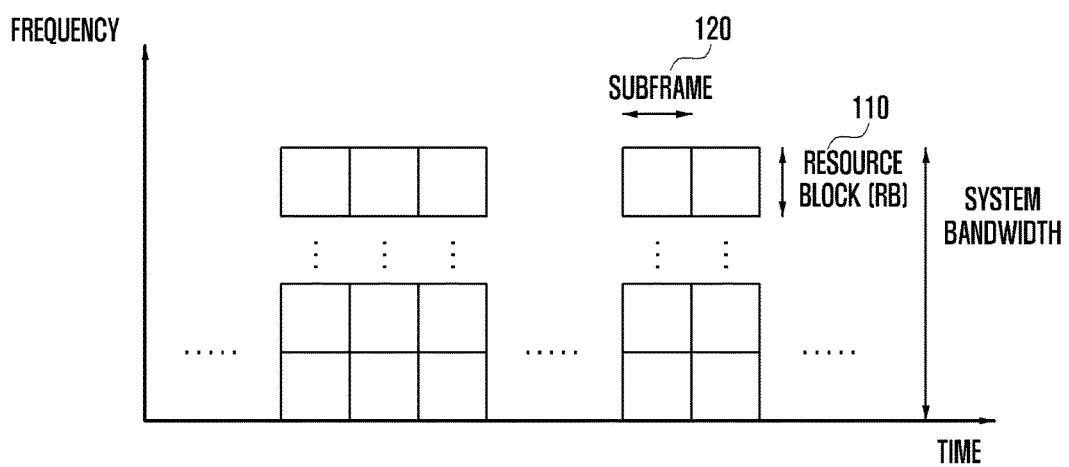
FIG. 1 is a graph illustrating a relationship between time and frequency resources in an LTE/LTE-A system.
Figure 2:
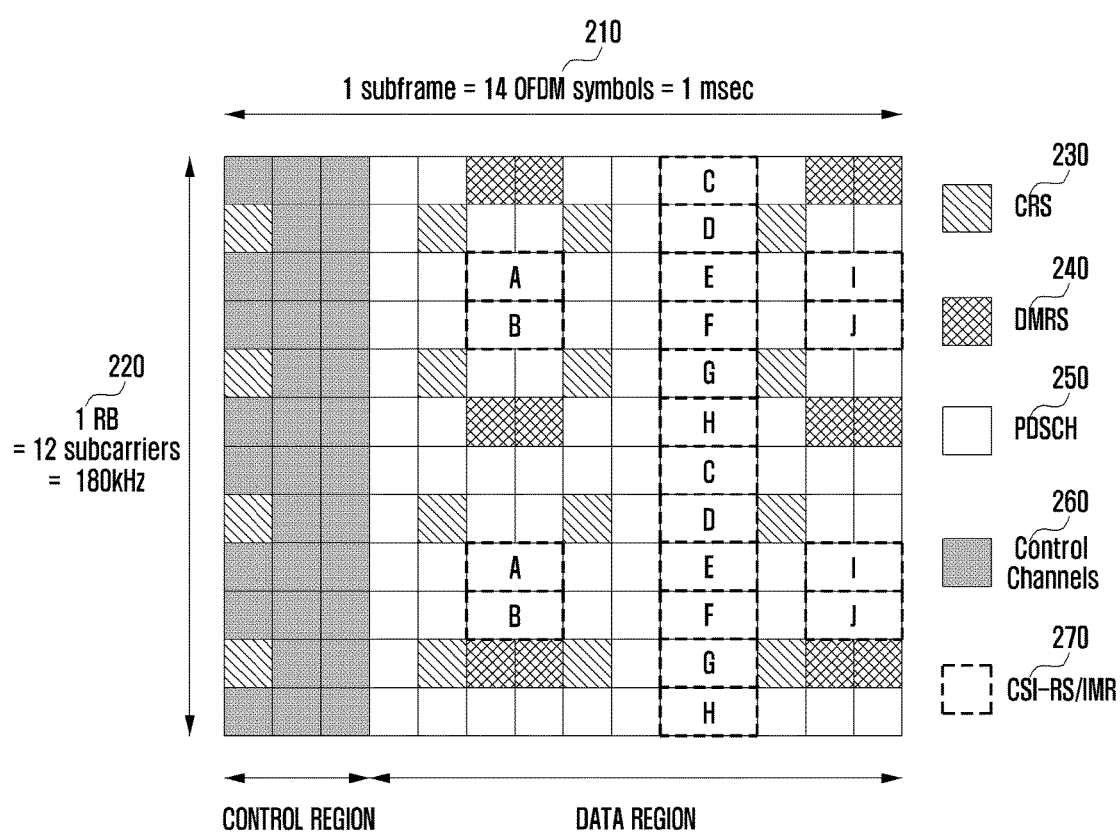
FIG. 2 is a time-frequency grid illustrating a single resource block of a downlink subframe as a smallest scheduling unit in the LTE/LTE-A system.

Embodiments of the present invention are described with reference to the accompanying drawings in detail. Detailed description of well-known functions and structures incorporated herein may be omitted to avoid obscuring the subject matter of the present invention. This aims to omit unnecessary description so as to make the subject matter of the present invention clear.

For the same reason, some elements are exaggerated, omitted or simplified in the drawings and the elements may have sizes and/or shapes different from those shown in drawings, in practice. The same reference numbers are used throughout the drawings to refer to the same or like parts.

Typically, a cellular radio mobile communication system is comprised of a plurality of cells distributed within an area. Each cell is centered around a base station responsible for communication with mobile terminals. The base station includes antennas and a signal processing part for providing mobile communication services to the terminals within the cell. Such a system in which the antennas are placed at the center of the cell is referred to as a Centralized Antenna System (CAS) and typical in a normal mobile communication system.

In contrast, a system in which the antennas are distributed in the range of the service area of the cell is referred to as a Distributed Antenna System (DAS) and is advantageous in providing improved mobile communication service as compared to the CAS. The present invention provides an interference measurement method and apparatus for efficient communication in DAS with antennas distributed in the service area of each base station.

The following terms are defined in consideration of the functionality in the present invention, and may vary according to the intention of a user or an operator, usage, etc. Therefore, the definition should be made on the basis of the overall content of the present specification.

Although the description is directed to the OFDM-based radio communication system, particularly the 3GPP EUTRA, it will be understood by those skilled in the art that the present invention can be applied to other communication systems having a similar technical background and channel format, with a slight modification, without departing from the spirit and scope of the present invention.

According to an embodiment of the present invention, the interference control method of a UE in the wireless communication system includes receiving a radio resource control signal including allocation of at least one Channel Status Information Reference Signal (CSI-RS) from an eNB, identifying a DeModulation Reference Signal (DMRS) of an interference signal and Quasi Co-Location (QCL) reference signal for at least one parameter based on the radio resource control signal, receiving downlink control information including an indicator indicating the DMRS of the interference signal and the QCL reference signal from the eNB, and estimating channel characteristics of the interference signal based on the information matching the indicator in the checked information.

According to another embodiment of the present invention, the interference control method of the base station in a wireless communication system includes transmitting a wireless resource control signal including allocation of at least one Channel Status Information Reference Signal (CSI-RS) resource to the UE and transmitting a downlink control information including an indicator indicating the DMRS of an interference signal and QCL reference signal to the UE, wherein the UE identifies the DMRS of the interference signal and QCL reference signal for at least one parameter and estimates channel characteristics of the interference signal based on the information matching the indicator in the checked information.

According to another embodiment of the present invention, the terminal for controlling interference in a wireless communication system includes a receiver which receives a radio resource control signal including allocation of at least one Channel Status Information Reference Signal (CSI-RS) from an eNB and a controller which identifies a DeModulation Reference Signal (DMRS) of an interference signal and Quasi Co-Location (QCL) reference signal for at least one parameter based on the radio resource control signal, receives downlink control information including an indicator indicating the DMRS of the interference signal and QCL reference signal from the eNB, and estimates channel characteristics of the interference signal based on the information matching the indicator in the checked information.

According to another embodiment of the present invention, an eNB for controlling interference in a wireless communication system includes a transmitter which transmits a wireless resource control signal including allocation of at least one Channel Status Information Reference Signal (CSI-RS) resource to a UE and a controller which controls the transmitter to transmit a downlink control information including an indicator indicating the DMRS of an interference signal and a QCL reference signal to the UE, wherein the UE identifies the DMRS of the interference signal and QCL reference signal for at least one parameter and estimates channel characteristics of the interference signal based on the information matching the indicator in the checked information.

According to another embodiment of the present invention, an interference control method of a UE in a wireless communication system includes receiving a wireless resource control signal including allocation of at least one Channel Status Information Reference Signal (CSI-RS)

resource from an eNB, checking information on a DeModulation Reference Signal (DMRS) of an interference signal and Quasi Co-Location (QCL) CSI-RS for at least one parameter and downlink resource mapping information of the interference signal; receiving downlink control information including an indicator indicating jointly DMRS of the interference signal and a QCL reference signal and downlink resource mapping of a transmission cell from the eNB; and estimating channel characteristics of the interference signal based on the information matching the indicator in the checked information.

In a typical mobile communication system, an eNB is located at the center of each cell and provides UEs with mobile communication service using one or more antennas located at a restricted place. The mobile communication system in which each cell is provided with antennas arranged at the same position is referred to as a Centralized Antenna System (CAS). In contrast, the mobile communication system in which the antennas (Remote Radio Heads; RRHs) belonging to a cell are distributed within the cell is referred to as a Distributed Antenna System (DAS).

Figure 3:
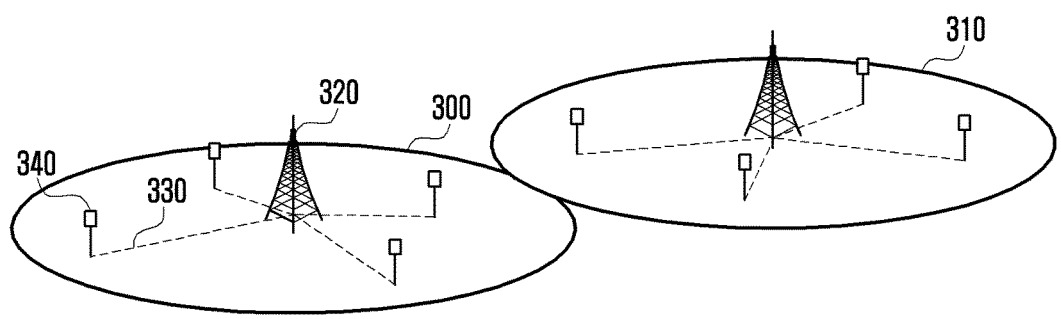
FIG. 3 is a diagram illustrating an antenna arrangement in the conventional distributed antenna system.

FIG. 3 is a diagram illustrating an antenna arrangement in the conventional distributed antenna system.

In FIG. 3, there are distributed antenna system-based cells 300 and 310. The cell 300 includes five antennas including one high power transmission antenna 320 and four low power antennas 340. The high power transmission antenna 320 is capable of providing at least minimum service within the coverage area of the cell while the low power antennas 340 are capable of providing UEs with a high data rate service within a restricted area. The low and high power transmission antennas are all connected to a central controller and operate in accordance with the scheduling and radio resource allocation of the central controller. In the distributed antenna system, one or more antennas may be deployed at one geometrically separated antenna position. In the distributed antenna system, antenna(s) deployed at the same position is referred to as Remote Radio Head (RRH).

In the distributed antenna system depicted in FIG. 3, the UE receives signals from one geometrically distributed antenna group and regards the signals from other antenna groups as interference.

Figure 4:
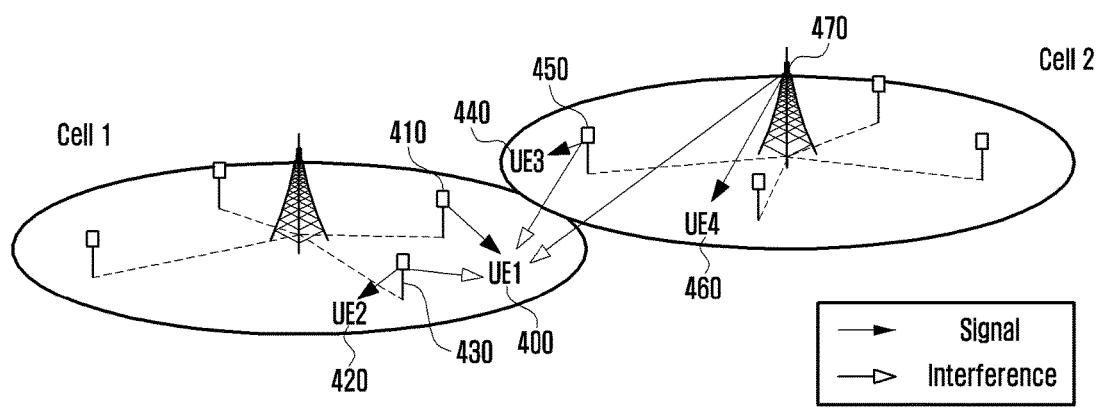
FIG. 4 is a diagram illustrating a situation of interference between antenna groups transmitting different UEs in the conventional distributed antenna system.

FIG. 4 is a diagram illustrating a situation of interference between antenna groups transmitting to different UEs in the conventional distributed antenna system.

In FIG. 4, the UE1 400 is receiving traffic signals from the antenna group 410. Meanwhile, the UE2 420, UE3 440, and UE4 460 are receiving traffic signals from antenna groups 430, 450, and 470, respectively. The UE1 400 which is receiving traffic signals from the antenna group 410 is influenced by the interference of the other antenna groups transmitting traffic signals to other UEs. That is, the signals transmitted the antenna groups 430, 450, and 470 cause interference to UE1 400.

Typically, in the distributed antenna system, interferences caused by other antenna groups are classified into two categories:

Inter-cell interference: interference caused by antenna groups of other cells

Intra-cell interference: interference caused by antenna groups of same cell

In FIG. 4, the UE 1 400 undergoes intra-cell interference from the antenna group 430 of the same cell and inter-cell interference from the antenna groups 450 and 470 of the neighbor cell. The inter-cell interference and the intra-call interference affect the data channel reception of the UE simultaneously.

Typically, the signal received by a UE consists of the desired signal, noise, and interference. The received signal may be expressed as Equation (1).

$$r = s + \text{noise} + \text{interference} \quad (1)$$

In Equation (1), 'r' denotes the received signal, 's' denotes the transmitted signal, 'noise' denotes noise with Gaussian distribution, and 'interference' denotes an interference signal occurring in radio communication. The interference signal may occur in the following situations.

Interference from a nearby transmission point: Signals transmitted by neighbor cells or adjacent antennas of DAS cause interference to the desired signal Interference at the same transmission point: Signals transmitted to different users in MU-MIMO transmission using plural antennas at one transmission point interfere with each other.

The SNIR varies depending on the amount of interference and thus affects the reception performance. In the cellular mobile communication system, how to control the interference (as the main factor of degrading system performance) efficiently determines the system performance. In LTE/LTE-A, various technologies for supporting Coordinated Multi-Point Transmission and Reception (CoMP) have been introduced to control interference. In CoMP, the network controls the transmissions of plural eNBs or transmission points integrally at the center to determine the presence/absence of interference and interference amounts in the downlink and uplink.

Assuming that two eNBs exist, the central controller controls one eNB to suspend signal transmission so as to avoid interference to the UE which receives signals from the other eNB.

In the wireless communication system, an error correction code is use to correct errors occurring in the signal communication. In the LTE/LTE-A system, a convolution code and turbo code are used as error correction codes. In order to improve the decoding performance of the error correction code, the receiver uses soft decision making rather than hard decision making in demodulating the symbol modulated at Quadrature Phase Shift Keying (QPSK), 16QAM, 64QAM, or the like. If '+1' or '−1' is transmitted by the transmitter, the receiver making a hard decision selects one of '+1' and '−1' and outputs the selection result. In contrast, the receiver making a soft decision outputs the information indicating which is selected between '+1' and '−1' and the reliability of decision making. The reliability information can be used for improving the decoding performance in the decoding process.

Typically, the soft decision receiver uses Log Likelihood Ratio (LLR) for computing the output value. When the BPSK modulation scheme having the output value of '+1' or '−1' is applied to the transmission signal, LLR is defined in Equation (2) as follows:

$$LLR = \log \frac{f(r \mid s = +1)}{f(r \mid s = -1)} \quad (2)$$

In Equation (2), 'r' denotes the reception signal, and 's' denotes the transmission signal. The conditional probability density function $f(r|s=+1)$ is of the reception signal under the assumption that '+1' is transmitted as the transmission signal. In QPSK, 16QAM, and 64QAM schemes, LLR can be expressed in a similar way. The conditional probability density function is likely to have Gaussian distribution in the situation where interference exists.

Figure 5:
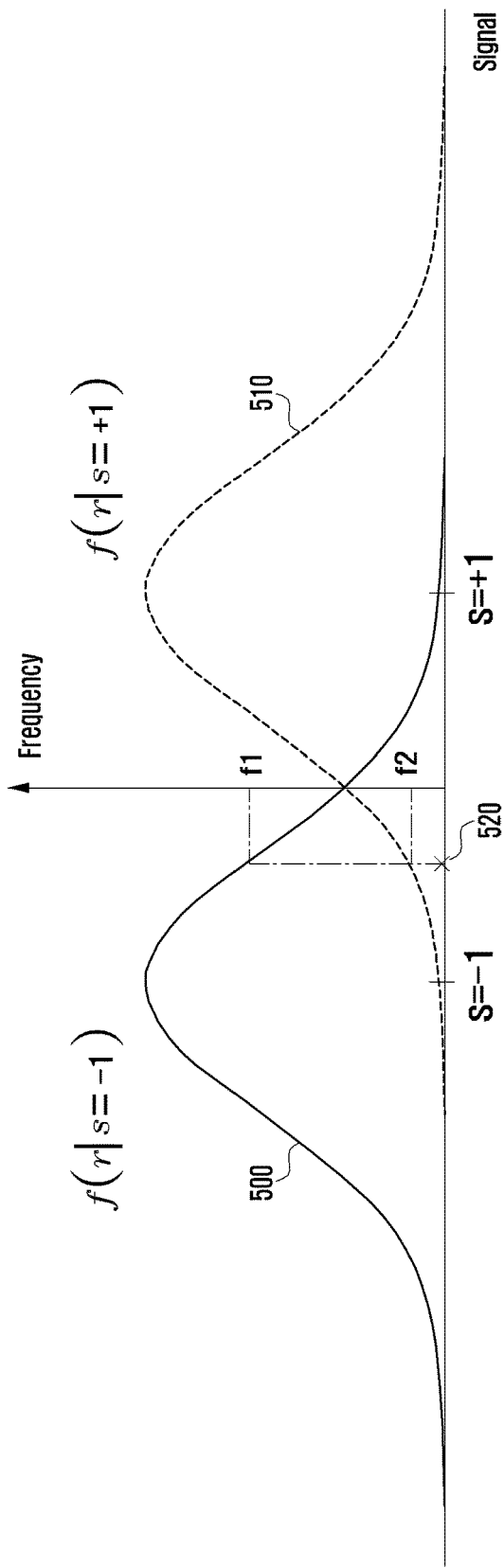
FIG. 5 is a graph illustrating the conditional probability density function of the received signal.

FIG. 5 is a graph illustrating the conditional probability density function of the received signal.

In FIG. 5, the first curve 500 denotes a conditional probability density function $f(r|s=-1)$ and the second curve 510 denotes another conventional probability density function $f(r|s=+1)$ When the received signal has the value corresponding to the second curve 510, the receiver calculates LLR with $\log(f2/f1)$. The conditional probability density functions of FIG. 5 correspond to the case where the noise and interference have Gaussian distribution.

In the LTE/LTE-A mobile communication system, an eNB transmits information of a few or more bits to the UE through a single Physical Downlink Shared CHannel (PDSCH) transmission. The eNB encodes the information to be transmitted to the UE and modulates the encoded information in a modulation scheme such as QPSK, 16QAM, and 64QAM. Accordingly, if the PDSCH is received, the UE generates LLRs of a few dozen or more coded symbols to the decoder.

Typically, the noise has Gaussian distribution, but the interference may not have Gaussian distribution in any situation. The reason why the interference does not have Gaussian distribution is because the interference is the radio signals transmitted to other receivers. That is, since the 'interference' of Equation (1) denotes the radio signals transmitted to other receivers, at least one modulation scheme of BPSK, QPSK, 16QAM, and 64QAM is applied thereto. When the interference signal is modulated in BPSK, the interference has a probability distribution of '+k' or '−k' at the same probability. Here, 'k' is a value determined by the signal strength attenuation effect on the radio channel.

Figure 6:
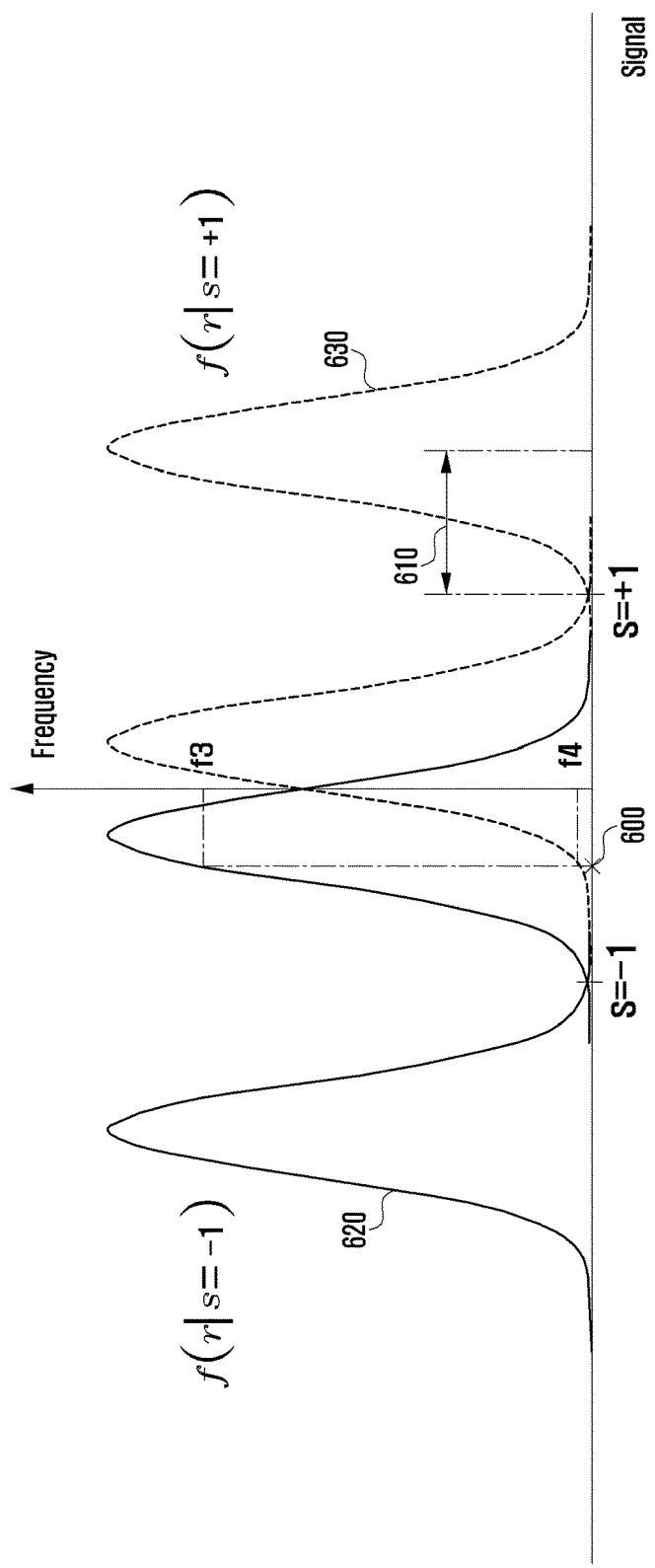
FIG. 6 is a graph illustrating the conditional probability density function under the assumption that both the desired signal and interference signal are modulated in Binary Phase Shift Keying (BPSK)

FIG. 6 is a graph illustrating the conditional probability density function under the assumption that both the desired signal and interference signal are modulated in BPSK.

In FIG. 6, it is assumed that the noise has Gaussian distribution.

The conditional probability density function of FIG. 6 differs from that of FIG. 5. In FIG. 6, the first curve 620 denotes the conditional probability density function $f(r|s=-1)$, and the second curve 630 denotes the conditional probability density function $f(r|s=+1)$. The size of the distribution distance 610 is determined depending on the signal strength of the interference signal and depends on the influence of the radio channel. When the received signal value corresponds to the first curve 500 of FIG. 5 with the conditional probability density function, the receiver calculates LLR with $\log(f4/f3)$. This value differs from the LLR value in the case of FIG. 5 due to the difference in conditional probability density function. That is, the LLR obtained in consideration of the modulation scheme of the interference signal differs from the LLR obtained under the assumption of Gaussian distribution.

Figure 7:
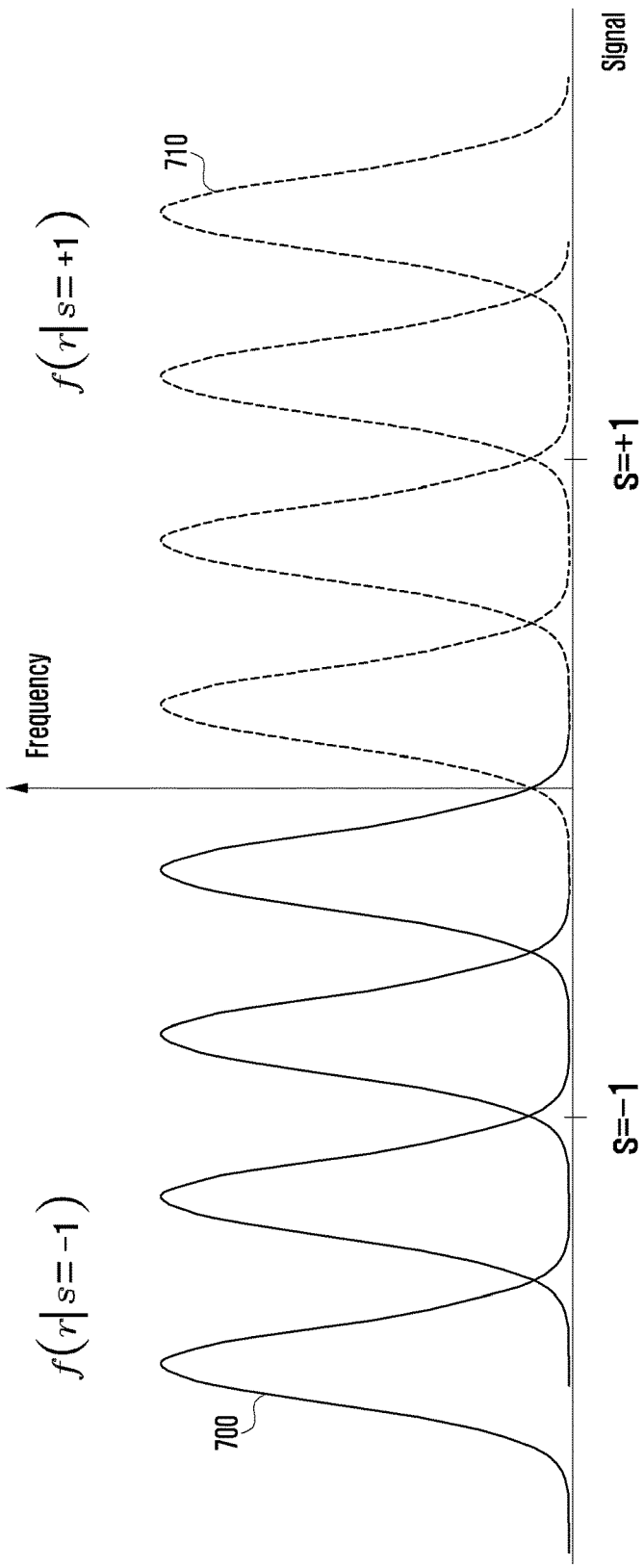
FIG. 7 is a graph illustrating the conditional probability density function under the assumption that the desired signal is modulated in BPSK and the interference signal is modulated in 16QAM (Quadrature Amplitude Modulation)

FIG. 7 is a graph illustrating the conditional probability density function under the assumption that the desired signal is modulated in BPSK and the interference signal is modulated in 16QAM.

Referring to FIG. 7, it is shown that the conditional probability density function may vary depending on the modulation scheme of the interference. The desired signal is modulated in BPSK in both the cases of FIGS. 6 and 7, while the interference is modulated in BPSK in FIG. 6 and 16QAM in FIG. 7. That is, although the desired signal is modulated in the same modulation scheme, the conditional probability density function varies depending on the modulation scheme of the interference signal, resulting in different LLRs.

The first curve 700 denotes the conditional probability density function $f(r|s=-1)$, and the second curve 710 denotes the conditional probability density function $f(r|s=+1)$.

As described with reference to FIGS. 5, 6, and 7, LLR varies depending on the assumption for interference. In order to optimize the reception performance, it is necessary to calculate LLR using the conditional probability density function reflecting the statistical characteristic of the real interference. That is, if the interference is modulated in BPSK, the receiver has to calculate LLR under the assumption that the interference signal is modulated in BPSK. Where the interference has been modulated in BPSK, if the receiver assumes Gaussian distribution or 16QAM, it fails to obtain the optimal LLR, resulting in degradation of reception performance.

Figure 8:
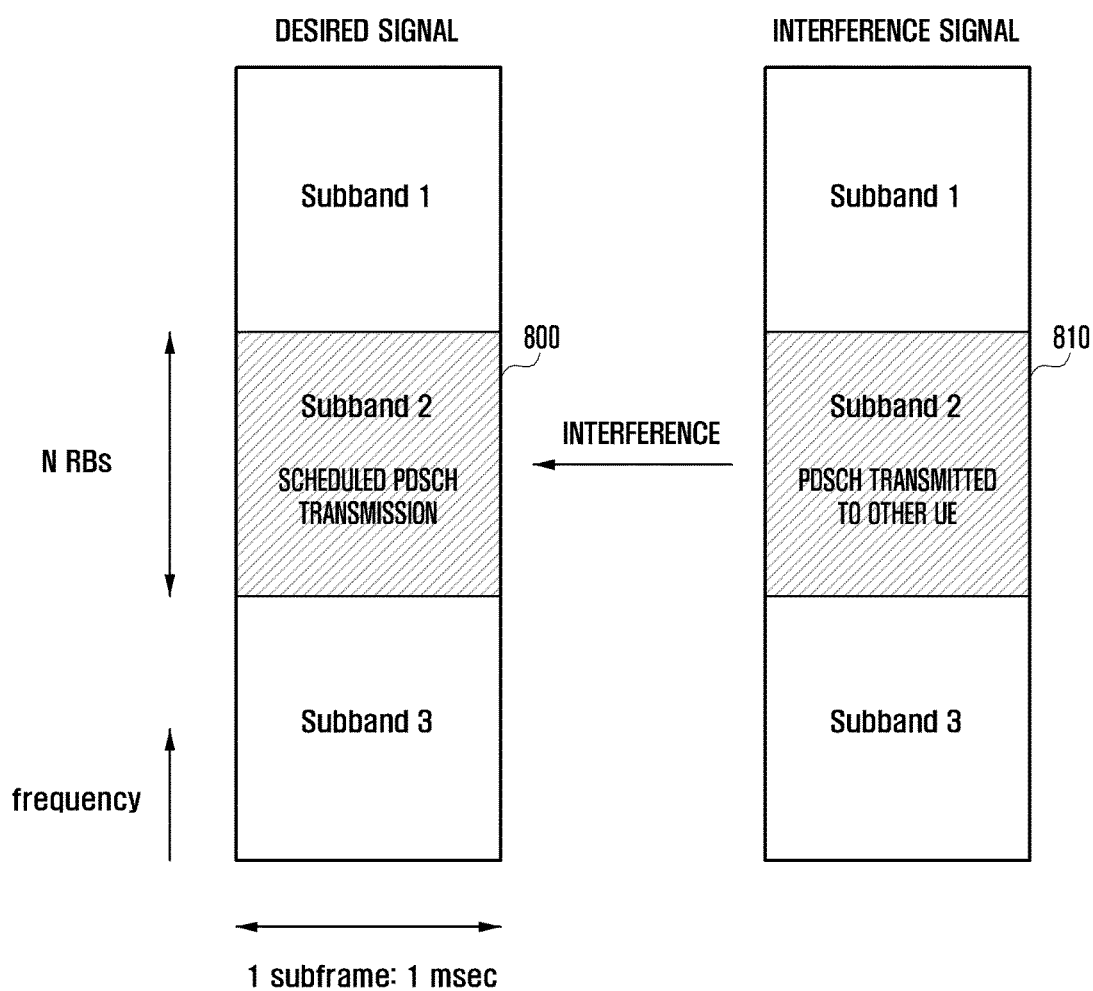
FIG. 8 is a diagram exemplifying the desired signal and interference signal in the LTE/LTE-A system.

FIG. 8 is a diagram exemplifying the desired signal and interference signal in the LTE/LTE-A system.

Referring to FIG. 8, the UE attempts to receive the radio signal 800. At this time, the signal 810 transmitted to another UE causes interference to the UE. In the LTE/LTE-A system, this situation occurs when the desired signal and the interference signal are transmitted at the same subframe on the same frequency band. In FIG. 8, it is assumed that the desired signal and the interference signal are transmitted across N RBs.

In FIG. 8, in order to calculate the optimal LLR in the process of detecting the desired signal, the UE has to know the conditional probability density reflecting the statistical characteristic of the interference signal 810 accurately. The main information for the receiver to achieve this includes at least one modulation scheme applied to the interference signal and received signal strength of the interference signal. That is, the value designated by reference number 610 of FIG. 6 can be acquired based on at least one of the modulation scheme and signal strength of the interference signal, thereby calculating an accurate conditional probability density function.

In order to check the modulation scheme of the interference signal, the eNB may include the information on the radio signal 800 transmitted to the UE and the modulation scheme of the interference signal 810 in the control information for use in data (PDSCH) scheduling. In detail, the control information for use in scheduling the PDCCH to the UE in the legacy LTE-A system is transmitted through the PDCCH or enhanced PDCCH (ePDCCH), the scheduling information is shown in Table 1, and both the control and scheduling information include the information on the radio signal 800 transmitted to the UE.

TABLE 1

| Information | Description |
| --- | --- |
| Resource allocation information (RB assignment) | Information on location of PDCCH transmitted to UE in RB |
| Modulation and Coding Scheme (MCS) information | Modulation scheme and coding rate information on PDSCH transmitted to UE (correspond MCS information may include one MCS information for the case of transmitting one codeword and two MCS informations for the case of transmitting two codewords depending on the MIMO transmission condition) |
| Antenna port, scrambling ID, number of layers | Antenna port number, sequences, and number of transmission layers of DMRS for estimating PDSCH transmission channel |
| Others | Transmission carrier index, HARQ index, DL control channel information, etc. |

In the legacy LTE-A system shown in Table 1, it can be considered to add the control information for notifying the UE of the modulation scheme of the interference signal as shown in Table 2 to the control information for use in PDSCH scheduling.

TABLE 2

| 2-bit control information | Description |
|---|---|
| 00 | Interference signal modulated in QPSK |
| 01 | Interference signal modulated in 16QAM |
| 10 | Interference signal modulated in 64QAM |
| 11 | Interference signal not modulated in any modulation scheme |

Table 2 shows 2-bit control information for indicating the modulation scheme of the interference signal. Using the 2-bit control signal as shown in Table 2, the eNB notifies the UE of the modulation scheme applied to the signal causing interference to the UE. The terminals assumes QPSK with the control information set to '00', and 16QAM with control information set to '01', 64QAM with control information set to '10'. If the control information is set to '11', the UE assumes that the interference signal is not modulated in any modulation scheme. The eNB may notify the UE that no specific modulation scheme is applied to the interference in the following cases.

When there is no significant interference signal affecting the UE

When the interference signal has no regular modulation scheme

When the interference signal exists at a part of the frequency band carrying the reception signal If there is no interference signal affecting the UE significantly, in this case the neighbor eNBs do not transmit signals. If the interference signal has no regular modulation scheme, in this case there are interference signals having different modulation schemes on the time-frequency resource occupied by the reception signal of the UE. For example, if the UE receives PDSCH on RB1 and RB2 in the frequency domain, the interference signal may be modulated in QPSK in RB1 and 16QAM in RB2. Even when the interference signal exists at a part of the frequency band carrying the reception signal, the eNB may notify the UE that no modulation scheme is applied to the interference signal by setting the control information to '11'. In an embodiment of the present invention, the values mapped to the individual bits are not limited to the case of Table 2 but may be set differently.

TABLE 3

| 1-bit control information | Description |
|---|---|
| 0 | Interference signal is modulated in a certain modulation scheme |
| 1 | Interference signal is not modulated in a certain modulation scheme |

Table 3 shows 1-bit control information for indicating the modulation scheme of the interference signal.

When using 1-bit control information to notify the UE of the modulation scheme as shown in Table 3, the 1 bit may be set to indicate whether the UE applies interference cancellation. If the control information indicates that the interference signal is modulated in a certain modulation scheme, the UE applies all available modulation schemes and then selects the most reliable modulation scheme. If the control information indicates that the interference signal is not modulated in any modulation scheme, the UE determines that no modulation scheme is applied to the interference signal as in Table 2. In an embodiment of the present invention, in order to instruct the UE to not perform interference cancellation, the eNB may send the UE the 1-bit control information set to 1 as shown in Table 3.

If the control information as shown in Table 2 or 3 is received, the UE is capable of determining the modulation scheme applied to the signal causing interference to the desired signal.

Figure 9:
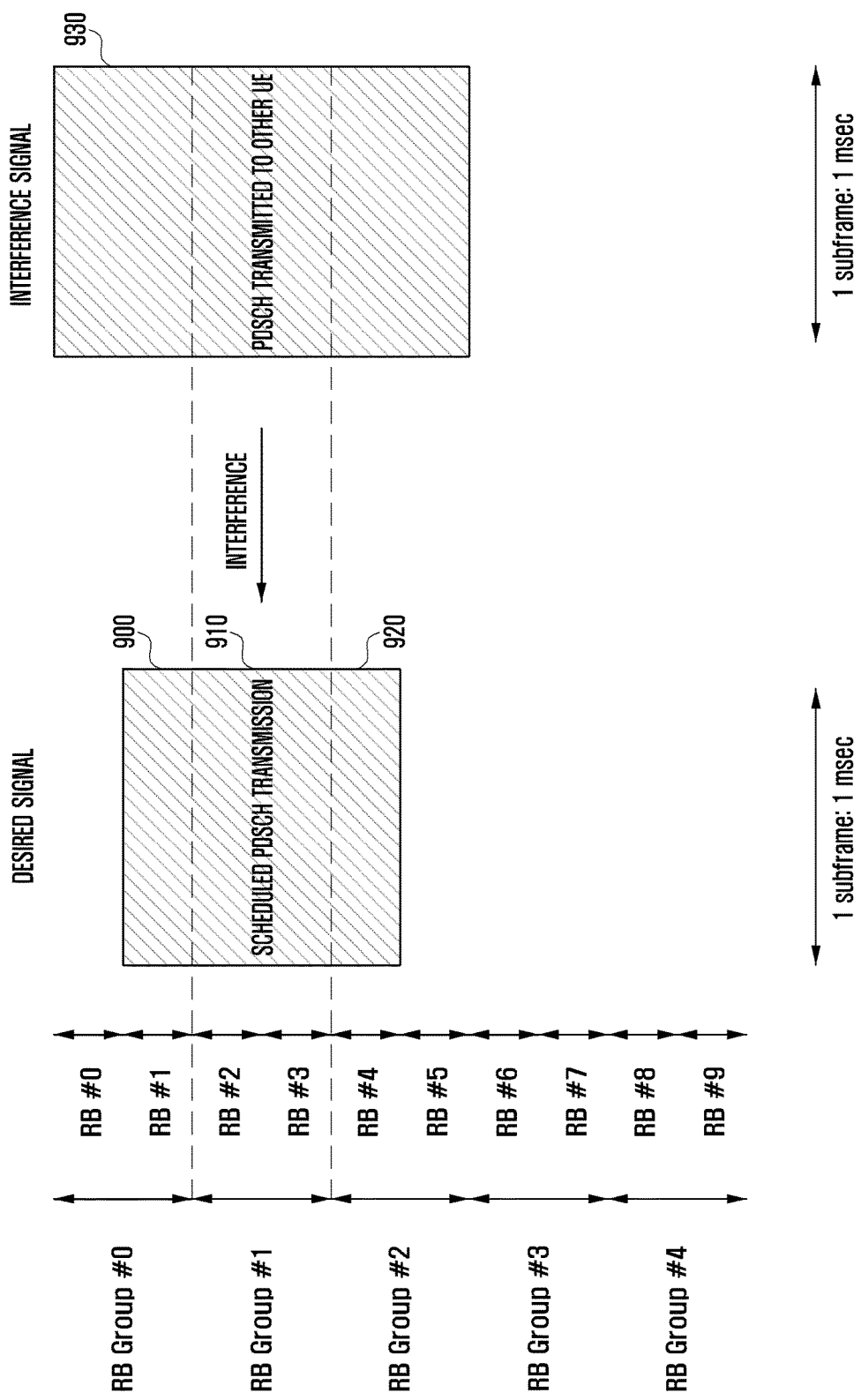
FIG. 9 is a diagram illustrating a principle of the interference cancellation procedure of the terminal by applying Inference Aware Detection (IAD) based on the control signal indicating the modulation scheme applied to the interference signal according to an embodiment of the present invention.
Figure 10:
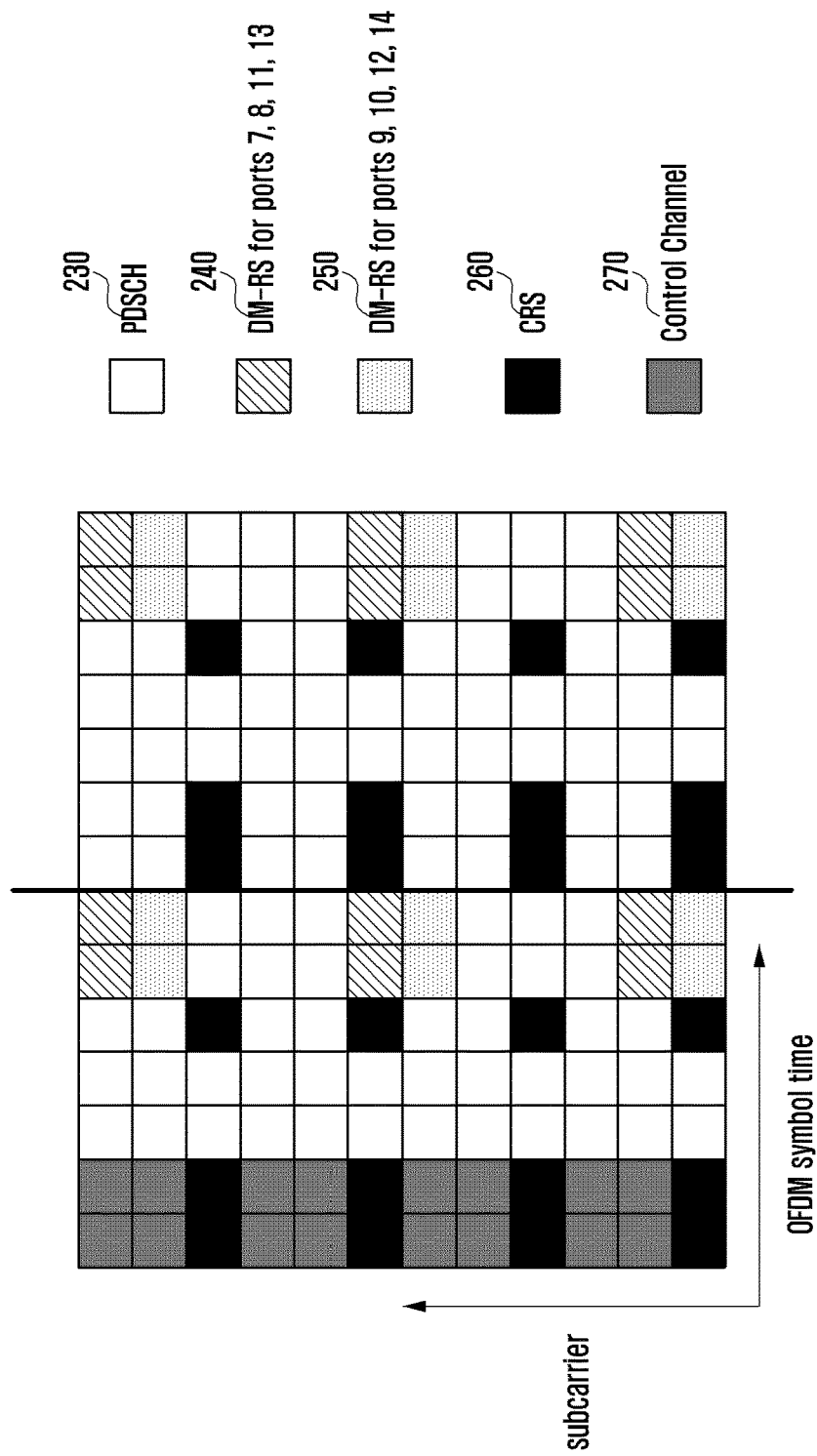
FIG. 10 is a diagram illustrating a time-frequency resource structure according to an embodiment of the present invention.

FIG. 9 is a diagram illustrating a principle of the interference cancellation procedure of the terminal by applying Inference Aware Detection (IAD) based on the control signal indicating the modulation scheme applied to the interference signal according to an embodiment of the present invention, and FIG. 10 is a diagram illustrating a time-frequency resource structure according to an embodiment of the present invention.

Referring to FIGS. 9 and 10, the UE receives the PDSCH across RB1, RB2, RB3, and RB 4 in the frequency domain. At this time, the interference signal 930 affecting the desired signal of the UE is received simultaneously. On the basis of the 1-bit or 2-bit control signal, the UE determines the modulation scheme applied to the interference signal 930. Then the UE measures the interference signal on the frequency bands 900, 910 and 920 of the desired signal and generates LLRs on the PDSCHs received in the frequency bands 900, 910, and 920 of the desired signal based on the measurement result. The reason why the UE measures the interference signal in the frequency bands 900, 910, and 920 of the desired signal is because the radio channel varies on the respective frequency bands due to the frequency selective fading.

In FIG. 9, the radio channel in RB1 differs from the radio channel in RB2. If the radio channel varies in this way, the statistical characteristic of the interference varies too. In an embodiment, IAD is implemented in such a way of grouping the entire system bandwidth into a plurality of RB Groups (RBGs) and performing interference measurement per RBG. In order to implement the IAD for generating LLR in consideration of the statical characteristic of interference, the UE checks the RBGs of the frequency bands 900, 910, and 920 of the signal carrying PDSCH and measures interference independently by taking into consideration thereof.

In order to implement the IAD for generating LLR in consideration of the statistical characteristic of interference efficiently, accurate interference measurement is inevitable. The UE measures the interference signal causing interference to PDSCH addressed to itself to determine the received signal strength for use in IAD operation. The present invention provides a method for measuring DMRS as one of the signals causing interference for interference measurement. DMRS is designed for measuring the influence of the radio channel in receiving PDSCH at the UE. That is, the UE estimates the radio channel carrying PDSCH based on DMRS. Since the same precoding is applied to PDSCH and DMRS, the UE is capable of checking the influence of the interference occurring at the PDSCH region by measuring DMRS. In this way, DMRS can be used to estimate interference caused by other eNBs as well as to receive the PDSCH. That is, the UE may measure the DMRS transmitted from another eNB to another UE to check whether the signal addressed to the other UE causes interference to the UE.

An embodiment of the present invention provides an interference channel measurement method which is implemented in such a way of defining, at the eNB, DMRS allocation resource for interference measurement and notifying the DMRS allocation resource of the UE. That is, the UE receives the information on DMRS for both the desired signal and interference through scheduling information of the eNB in receiving PDSCH. At this time, the DMRS information for UE may include at least one of following elements:

DMRS information 1: DMRS information for use in measuring a channel carrying PDSCH addressed to the UE DMRS information 2: DMRS information for use in interference channel measurement of the UE (Interferer DMRS information)

The DMRS information 1 is used for receiving the PDSCH addressed to the UE itself and corresponds to the information on the antenna port, scrambling ID, and then number of layers in Table 1. That is, the above information may include antenna ports allocated for PDSCH transmission to the UE itself and the scrambling sequence used.

The DMRS information 2 is necessary for the UE to perform channel measurement of interference and may include at least one of the following information for DMRS used by the UE for interference measurement:

1. DMRS antenna port information for interference measurement
2. DMRS scrambling information for interference measurement
3. Number of DMRS layers for interference measurement That is, the DMRS information 2 includes the information on the antenna ports to which DMRS for interference measurement is mapped, scrambling sequence applied to DMRS, and number of layers. Here, the number of DMRS layers for interference may be notified with explicit information or fixed to 1 without need to be included in the scheduling information. The DMRS allocated to other UEs are referred to as interferer DMRS, and the interferer DMRS-related information is referred to as interferer DMRS information.

In the IAD situation, the DMRS information 1 and DMRS information 2 may be included in the PDSCH scheduling information independently, and Table 4 shows a case where the DMRS information 1 and DMRS information 2 are configured in the same way.

arranged in one RB as shown in FIG. 10 and mapped to 4 REs using an orthogonal code of length 4 as shown in Table 5.

TABLE 5

| DMRS antenna port | Orthogonal code |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In Table 4, "scid" denotes the scrambling information of the DMRS sequence. In LTE/LTE-A, the DMRS sequence is a Gold sequence of length 31 and varies depending on the configuration of the initial state. That is, the initial state value of the same scrambling sequence generator determines the value of the sequence to be generated. In LTE/LTE-A, the initial state for the scrambling sequence of DMRS is defined in Equation (3) as follows:

$$c_{init}=(\lfloor n_s/2 \rfloor+1)\cdot(2X+1)\cdot 2^{16}+n_{SCID} \quad (3)$$

In Equation (3), $n_s$ denotes the slot index which is an integer selected in the range from 0 to 19 and information available after the UE acquires time synchronization. Since $n_s$ can be obtained after the UE acquires time synchronization, the extra information necessary for the UE in association with interferer DMRS scrambling is X and $n_{SCID}$ values. In Equation (3), X corresponds to the virtual Cell ID which is an integer in the range from 0 to 504. $n_{SCID}$ denotes the scid in Table 4 and is set to 0 or 1. In LTE/LTE-A, one of the two X values is determined according to $n_{SCID}$. That is, X is set to the value of X(0) preconfigured through higher layer signaling for the case of $n_{SCID}$ set to 0 and the value of X(1) preconfigured through higher layer signaling for the case of $n_{SCID}$ set to 1.

Although Table 4 provides the case under the assumption that the DMRS information 1 for the desired signal and the DMRS information 2 for interference are configured with 3 bits respectively and notified in the same manner and

TABLE 4

| Single codeword transmission: Codeword 0 activation Codeword 1 deactivation | | Two codewords transmission: Codeword 0 activation Codeword 1 deactivation | |
|---|---|---|---|
| Control information | Description | Control information | Description |
| 000 | 1 layer, port 7, scid = 0 | 000 | 2 layers, ports 7-8, scid = 0 |
| 001 | 1 layer, port 7, scid = 1 | 001 | 2 layers, ports 7-8, scid = 1 |
| 010 | 1 layer, port 8, scid = 0 | 010 | 2 layers, ports 9-10, scid = 0 |
| 011 | 1 layer, port 8, scid = 1 | 011 | 3 layers, ports 7-9, scid = 0 |
| 100 | 1 layer, port 9, scid = 0 | 100 | 4 layers, ports 7-10, scid = 0 |
| 101 | 1 layer, port 10, scid = 0 | 101 | Reserved |
| 110 | 2 layers, ports 7-8, scid = 0 | 110 | |
| 111 | 2 layers, ports 9-10, scid = 0 | 111 | |

Table 4 provides the DMRS antenna ports, DMRS scrambling sequence, and number of layers in the first and second columns corresponding to the scheduling of PDSCH with one codeword transmission, and the third and fourth columns corresponding to the scheduling of PDSCH with two codewords transmission. Here, DMRS antenna ports are PDSCH transmission is possible on up to 4 layers and scids of ports 9 and 10 are set to 0, the present invention is not limited thereto. The DMRS informations 1 and 2 may differ from each other in size, and the DMRS information 1 for the desired signal may be designed to transmit PDSCH on up to 8 layers.

In the following methods according to the first to third embodiments of the present invention, the UE is allocated the DMRS for the desired signal and the DMRS for interference and includes the information on the interference channel for use in DMRS-based channel measurement in the scheduling information so as to improve DMRS channel estimation performance to interference.

First Embodiment

In the OFDM system, if the eNB transmits reference signals of x(0), x(1), . . . , x(N−1) through N different subcarriers and if the UE receives signals of Y(0), Y(1), . . . , Y(N−1) through N subcarriers, the received signals may be expressed as a matrix represented by Equation (4).

$$\overline{Y} = X\overline{H} + \overline{V} \quad (4)$$

Here, $\overline{Y}=[Y(0), \ldots, Y(N-1)]^T$ and $X=\text{diag}(x(0), \ldots, x(N-1))$ are diagonal matrices having $x(n-1)$ as $n^{th}$ diagonal components, and $\overline{H}=[H(0), \ldots, H(N-1)]^T$ whose components denote channel values of individual subcarriers between the eNB and UE. $\overline{V}=[V(0), \ldots, V(N-1)]^T$ and each component can be modeled as a probability variable having independent Gaussian distribution as the reception noise of the UE.

Using a channel estimator, the UE estimates channel value per subcarrier $\overline{H}$ with the received signal and a known reference signal value. Least Square (LS) and Minimum Mean Square Error (MMSE) are representative channel estimation methods. The LS channel estimation method is expressed by Equation (5).

$$\overline{H}_{LS} = \arg\min_{\tilde{H} \in C^N} \|\overline{Y} - X\tilde{H}\|^2 = X^{-1}\overline{Y} \quad (5)$$

Here, $C^{N \times N}$ denotes a set of complex vectors having N components. The MMSE estimation method is expressed by Equation (6).

$$\overline{H}_{MMSE} = \arg\min_{\tilde{H}=W\overline{Y}, W \in C^{N \times N}} \|\overline{H} - \tilde{H}\|^2 = R_{HH}[R_{HH} + \sigma_V^2 I]^{-1} \overline{H}_{LS} \quad (6)$$

Here, $C^{N \times N}$ denotes a set of N×N complex matrices, $R_{HH}$ denotes an autocorrelation matrix of the channel matrix $\overline{H}$ and is defined as $R_{HH} = E[\overline{H}\overline{H}^H]$ which is derived simply from a delay profile of the channel between the eNB and the UE. $\sigma_V^2$ denotes the variance of reception noise. As known by comparing Equations (5) and (6), although the LS estimation method is implemented simply with the equation of the reception signal and reference signal as compared to the MMSE estimation method, the MMSE estimation method is advantageous in that a more accurate channel estimation value can be acquired using the delay profile and the statistical characteristic of the channel such as variance of the reception noise.

As described above, in order to acquire more accurate channel estimation performance with DMRS, it is necessary for the UE to know the statistical characteristic of the channel such as the delay profile of the channel carrying the DMRS. However, since the DMRS is transmitted in the RBs including PDSCH scheduling for the UE, the UE receiving PDSCH in a small number of RBs fails to secure resources large enough to extract the statistical characteristic of the channel. Accordingly, it may be considered to extract the statistical characteristic of the channel for use in DMRS channel estimation from the CRS or CSI-RS transmitted on the channel having the same statistical characteristic as DMRS across the entire system frequency band. That is, in the case of estimating DMRS of the signal component, the statistical characteristic of the channel which is extracted from the CRS or CSI-RS of the corresponding cell can be used for channel estimation based on DMRS since the UE receives the PDSCH and DMRS from the serving cell; however, there is no need to transmit the CRS or CSI-RS for extracting the statistical characteristic in the case of estimating DMRS of the interference component, because the cell incurring the interference is not clear. At this time, it is expressed that the CRS or CSI-RS for extracting the statistical characteristic for DMRS-based channel estimation is in the relationship of Quasi Co-Located (QCL) at the same position as DMRS. Particularly, since the delay profile of the channel is a very important channel characteristic in DMRS-based channel estimation, the CRS and CSI-RS for extracting the corresponding channel characteristic has to be assumed as QCL with the corresponding DMRS from the view point of Doppler shift, Doppler spread, average delay, and delay spread.

Figure 11:
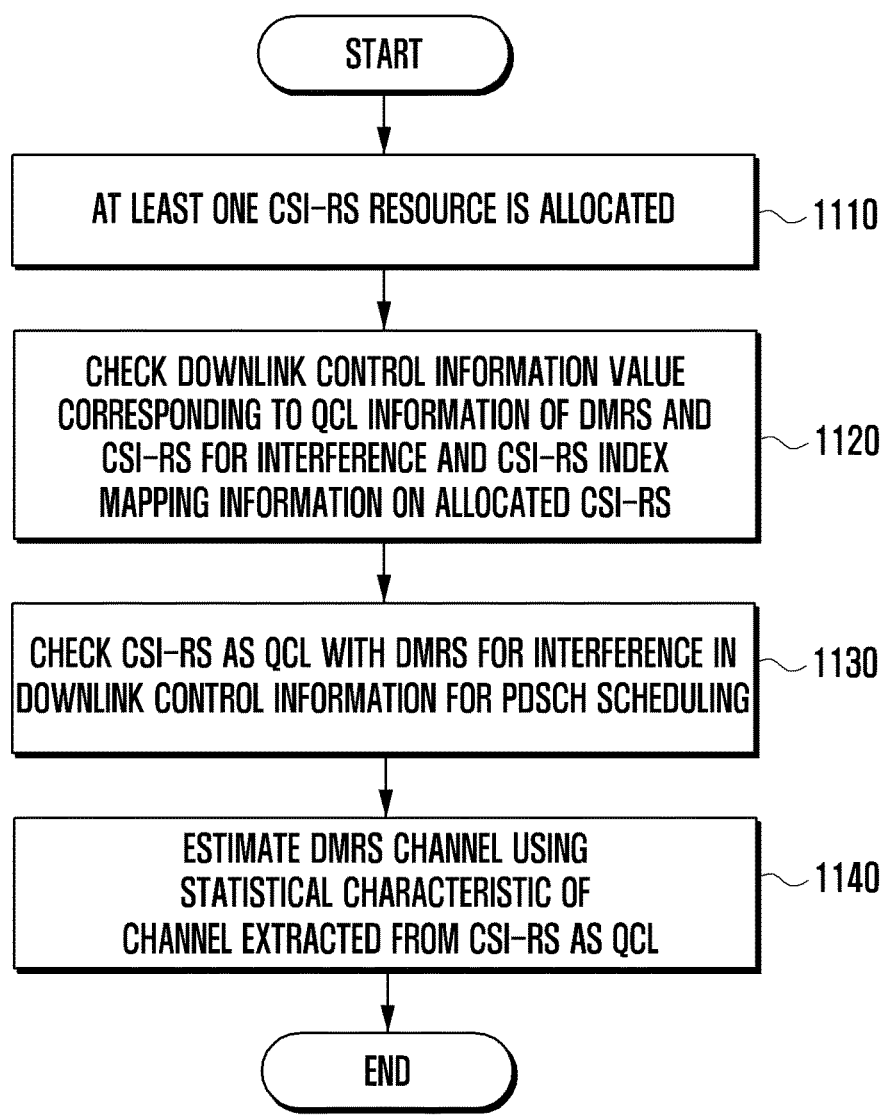
FIG. 11 is a flowchart illustrating the interference information determination procedure of the UE according to an embodiment of the present invention.

FIG. 11 is a flowchart illustrating the interference information determination procedure of the UE according to an embodiment of the present invention.

According to the first embodiment of the present invention, a method for the UE to receive the information on the CSI-RS for extracting the statistical characteristic of the channel for channel estimation of DMRS corresponding to interference in receiving specific PDSCH scheduling is described with reference to FIG. 11.

Referring to FIG. 11, the UE is allocated at least one CSI-RS resource through Radio Resource Control (RRC) information at step 1110. Here, the RRC information per CSI-RS for allocating the CSI-RS resource includes at least one of the following informations:

CSI-RS index

Number of CSI-RS antenna ports

Location of CSI-RS resource in RB

CSI-RS transmission subframe information

Scrambling information of CSI-RS sequence

Information on CRS Quasi Co-Located (QCL) with CSI-RS at same position

CRS index (Cell ID)

Number of CRS antenna ports

Information on subframe carrying no CRS (MBSFN (Multicast Broadcast Single Frequency Network) subframe)

Here, the CSI-RS allocation information may further include information on whether the CSI-RS is of the serving cell to which the UE has connected or an interfere cell.

The UE checks mapping information between the downlink control information value corresponding to DMRS for interference and QCL information of the CSI-RS and the CSI-RS index in step 1120. This operation of checking the information may be performed based on the received RRC signal. Here, the CSI-RS index corresponds at least one CSI-RS allocated at step 1110. That is, the index of CSI-RS capable of extracting statistical characteristic of the channel for channel estimation of the corresponding DMRS based on the QCL relationship with DMRS for interference is mapped to the downlink control information value corresponding to the QCL information in advance. In other words, if the downlink control information corresponding to the QCL information between DMRS and CSI-RS is 1 bit, step 1120 configures each row of Table 6 based on the RRC information.

TABLE 6

| QCL information of DMRS for interference | Description |
| --- | --- |
| 0 | First CSI-RS index configured as RRC information |
| 1 | Second CSI-RS index configured as RRC information |

When the downlink control information corresponding to QCL information of DMRS and CSI-RS is 2 bits, step 1120 configures each row of Table 7 based on the RRC information. Here, the information value of Table 6 or 7 may have no specific CSI-RS index and be configured for the operation without applying IAD or interpreted as the operation in which IAD is not applied to the corresponding information value if the CSI-RS index is not configured through RRC information.

TABLE 7

| QCL information value of DMRS for interference | Description |
| --- | --- |
| 00 | First CSI-RS index configured with RRC information |
| 01 | Second CSI-RS index configured with RRC information |
| 10 | Third CSI-RS index configured with RRC information |
| 11 | Fourth CSI-RS index configured with RRC information |

At step 1130, the UE checks the downlink control information transmitted on PDCCH in an actual PDSCH scheduling situation to read the QCL information value of DMRS for interference included therein to check the description of the corresponding value in Table 6 or 7 configured through RRC signaling at step 1120 so as to check the CSI-RS as QCL with DMRS for interference which is used for applying IAD to the PDSCH scheduled currently. For example, if the downlink control information value corresponding to QCL information of DMRS and the CSI-RS is 2 bits, and the corresponding information value transmitted on PDCCH is set to 01, the UE assumes that the CSI-RS corresponding to the second CSI-RS index configured through RRC signaling and the DMRS of the current interference are QCL in view of Doppler shift, Doppler spread, average delay, and delay spread.

Finally, the UE performs DMRS channel estimation using the statistical characteristic of the channel extracted from CSI-RS configured as QCL at step 1140. In addition, the UE may perform interference cancellation process based on the estimated DMRS channel information.

It can be also considered to perform an additional operation of checking the location of CRS using the CRS information as QCL transmitted at the same position as CSI-RS in CSI-RS information configured as QCL through the above procedure to select PDSCH REs to which IAD is to be applied. That is, since the cell incurring the interference component is not clear, it is difficult for the UE to check whether the data modulated in a specific modulation scheme or CRS is mapped to a specific time-frequency resource for the interference. Accordingly, the eNB may check the CRS information of the cell incurring interference based on the CRS information in the CSI-RS information configured as QCL in estimating DMRS in the case of applying IAD so as to perform decoding on PDSCH by selecting REs to which IAD is applied and CRS interference is cancelled. In correspondence to the UE operation depicted in FIG. 11, the eNB may send the UE the related information.

Second Embodiment

In the second embodiment of the present invention, the information on the CRS configured as QCL of DMRS for interference is unlike the first embodiment. In this case, there is no need of allocating extra CSI-RS resources for extracting statistical characteristics of the interference channel to the UE as compared to the first embodiment. That is, when receiving specific PDSCH scheduling, the information on CRS for extracting statistical characteristics of the channel other than CSI-RS for channel estimation of DMRS corresponding to the interference is transmitted.

Figure 12:
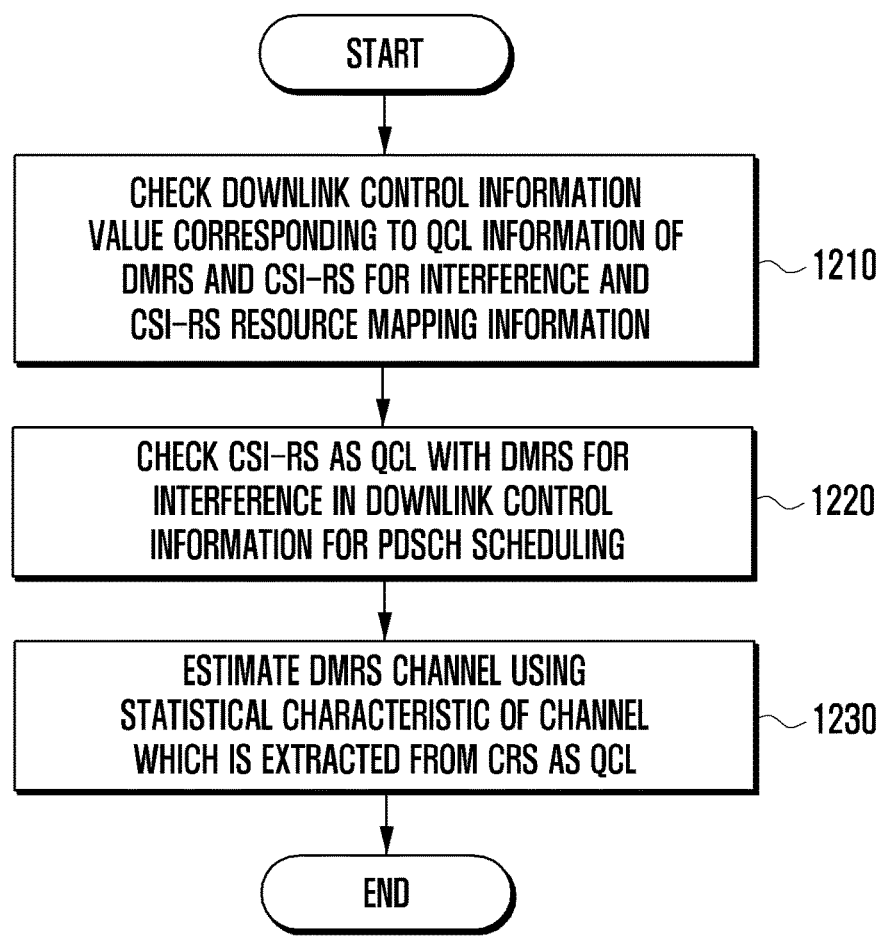
FIG. 12 is a flowchart illustrating the interference information determination procedure of the UE according to an embodiment of the present invention.

FIG. 12 is a flowchart illustrating the interference information determination procedure of the UE according to the second embodiment of the present invention.

Referring to FIG. 12, the UE checks the mapping of the downlink control information value corresponding to QCL information of DMRS and CRS for interference and the CRS resource information through RRC information at step 1210. Here, the CRS resource information may include at least one of following information.

CRS index (Cell ID of interference cell)

Number of CRS antenna ports

Information on the subframe carrying no CRS (MBSFN subframe)

That is, this is the procedure of mapping the resource information of CRS capable of extracting statistical characteristics of the channel for channel estimation of the corresponding DMRS in QCL relationship with DMRS for interference to the downlink control information value corresponding to the QCL information in advance. Otherwise, if the downlink control information value corresponding to QCL information of DMRS and CRS is 1 bit, step 1210 becomes a process of configuring each row of Table 8 through RRC information.

TABLE 8

| QCL information value of DMRS for interference | Description |
| --- | --- |
| 0 | First CRS resource information configured with RRC information: CRS index Number of CRS antenna ports MBSFN subframe information |
| 1 | Second CRS resource information configured with RRC information: CRS index Number of CRS antenna ports MBSFN subframe information |

If the downlink control information value corresponding to QCL information of DMRS and CRS is 2 bits, step 1210 becomes a process of configuring each row of Table 9 through RRC signaling. Here, the information value of Tables 8 or 9 may be configured through a process of not including specific CRS resource information and not applying IAD and, if CRS is not configured through RRC signaling, the corresponding information value may be interpreted through an operation to which the UE does not apply IAD.

TABLE 9

| QCL information value of DMRS for interference | Description |
| --- | --- |
| 00 | First CRS resource information configured with RRC information:<br>CRS index<br>Number of CRS antenna ports<br>MBSFN subframe information |
| 01 | Second CRS resource information configured with RRC information:<br>CRS index<br>Number of CRS antenna ports<br>MBSFN subframe information |
| 10 | Third CRS resource information configured with RRC information:<br>CRS index<br>Number of CRS antenna ports<br>MBSFN subframe information |
| 11 | Fourth CRS resource information configured with RRC information:<br>CRS index<br>Number of CRS antenna ports<br>MBSFN subframe information |

At step 1220, the UE checks the downlink control information transmitted on PDCCH in an actual PDSCH scheduling situation, reads QCL information of DMRS for interference included therein to check the description in Tables 8 or 9 preconfigured through RRC signaling at step 1210, and checks the CRS resource as QCL with DMRS for the interference in applying IAD to currently scheduled PDSCH. For example, if the downlink control information value corresponding to QCL information of DMRS and CRS is 2 bits and if the corresponding information value transmitted on PDCCH is set to 01, the UE interprets this as the second CRS configured through RRC signaling and DMRS for current interference are QCL in view of Doppler shift, Doppler spread, average delay, and delay spread.

The UE performs DMRS channel estimation using the statistical characteristics of the channel which is extracted from CRS configured as QCL at step 1230, and ends the channel estimation procedure.

In an embodiment of the present invention, it can be considered for the UE to perform an additional operation of checking the location of the CRS using CRS information configured as QCL through the above procedure and selecting PDSCH REs to which IAD is applied. That is, since the cell incurring the interference component is not clear, it is difficult for the UE to check whether the data modulated in a specific modulation scheme or CRS is mapped to specific time-frequency resource for the interference. Accordingly, the eNB may check the CRS information of the cell incurring interference based on the CRS information in the CSI-RS information configured as QCL in estimating DMRS in the case of applying IAD so as to perform decoding on PDSCH by selecting REs to which IAD is applied and CRS interference is cancelled.

Third Embodiment

In the third embodiment of the present invention, a method of notifying information on the REs of the interferer cell to which IAD is applied is added to the method of configuring QCL necessary for estimating the channel of DMRS for interferences that is provided in the first and second embodiments. The third embodiment may be implemented independently of the first and second embodiments.

Since the cell incurring the interference component is not clear, it is difficult for the UE to check whether the data modulated in a specific modulation scheme or CRS is mapped to specific a time-frequency resource for the interference. Also, it is not clear whether a specific time-frequency resource is allocated for PDSCH or PDCCH for the interference. When IAD is applied, it is necessary for the eNB to send the UE the resource mapping information of the cell incurring interference in addition to CRS or CSI-RS information for extracting statistical characteristics for estimating DMRS.

Figure 13:
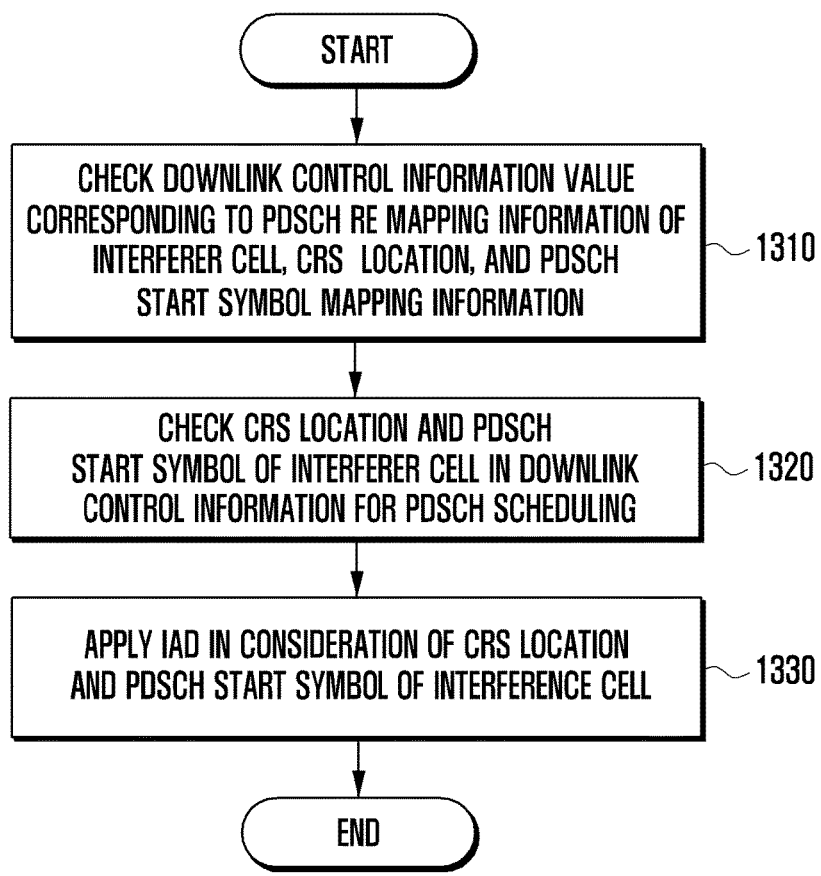
FIG. 13 is a flowchart illustrating the interference signal determination procedure of the UE according to an embodiment of the present invention.

FIG. 13 is a flowchart illustrating the interference signal determination procedure of the UE according to the third embodiment of the present invention.

A description is made of the method of transmitting resource mapping information for interference to which IAD is applied in scheduling specific PDSCH of the UE with reference to FIG. 13.

Referring to FIG. 13, in step 1310, the UE checks the downlink control information value corresponding to the resource mapping information, CRS position, and the mapping information of PDSCH start symbol in the interference cell to which IAD is applied through RRC information. Here, the information on the CRS position and PDSCH start symbol of the interferer cell may include at least one of following information.

- CRS offset (Cell ID of interferer cell or v_shift=(Cell ID mod 6) value)
- Number of CRS antenna ports
- Information on subframe carrying no CRS (MBSFN subframe)
- PDSCH start symbol: one of $\{1, 2, 3, 4\}$ This is the process of mapping the CRS resource and PDSCH start symbol information of the interferer cell to the downlink control information value corresponding to the resource mapping information of the interference cell. That is, if the downlink control information value corresponding to the resource mapping information of the interferer cell is 1 bit, step 1310 becomes a process of configuring each row of Table 10 through RRC information.

TABLE 10

| Resource mapping information of interferer cell | Description |
| --- | --- |
| 0 | 1. First CRS resource information configured with RRC information:<br>CRS offset<br>Number of CRS antenna ports<br>MBSFN subframe information<br>2. First PDSCH start symbol information configured with RRC information |
| 1 | 1. Second CRS resource information configured with RRC information:<br>CRS offset<br>Number of CRS antenna ports<br>MBSFN subframe information<br>2. Second PDSCH start symbol information configured with RRC information |

If the downlink control information value corresponding to the resource mapping information of the interference cell is 2 bits, step 1310 becomes a process of configuring each row of Table 11 through RRC signaling. Here, the information value of Tables 10 or 11 may be configured through operation without inclusion of specific resource mapping information and application of IAD and, if CRS resource information is not configured through RRC signaling, the corresponding information value may be interpreted through the operation to which IAD is not applied.

TABLE 11

| Resource mapping information value of interferer cell | Description |
|---|---|
| 00 | 1. First CRS resource information configured with RRC information:<br>CRS offset<br>Number of CRS antenna ports<br>MBSFN subframe information<br>2. First PDSCH start symbol information configured with RRC information |
| 01 | 1. Second CRS resource information configured with RRC information:<br>CRS offset<br>Number of CRS antenna ports<br>MBSFN subframe information<br>2. Second PDSCH start symbol information configured with RRC information |
| 10 | 1. Third CRS resource information configured with RRC information:<br>CRS offset<br>Number of CRS antenna ports<br>MBSFN subframe information<br>2. Third PDSCH start symbol information configured with RRC information |
| 11 | 1. Fourth CRS resource information configured with RRC information:<br>CRS offset<br>Number of CRS antenna ports<br>MBSFN subframe information<br>2. Fourth PDSCH start symbol information configured with RRC information | included therein to check the description of Tables 10 or 11 preconfigured through RRC signaling at step 1310, and checks the CRS resource information and PDSCH start symbol information for interference which is used for applying IAD to the currently scheduled PDSCH. For example, if the resource mapping information value of the interferer cell is 2 bits and if the corresponding information value transmitted on PDCCH is set to 01, the UE checks the CRS resource information and PDSCH start symbol information of the second interference cell configured through RRC signaling.

At step 1330, the UE applies IAD for decoding PDSCH received using the CRS resource information and PDSCH start symbol information of the interferer cell checked at step 1320. According to an embodiment of the present invention, the UE may apply IAD to PDSCH decoding in consideration of interference components of other signals excluding an interference part of CRS of the interference cell in decoding PDSCH received by the UE based on the CRS resource information and PDSCH start symbol information of the interferer cell.

The resource mapping information of the interferer cell which is provided in Tables 10 or 11 for the UE according to the third embodiment of the present disclosure may be included in the downlink scheduling information independently of CSI-RS or CRS information configured as QCL in the first and second embodiments or notified to the UE along with the resource mapping information and QCL information of the interferer cell as 1-bit or 2-bit information. For example, the integration of first and third embodiments may be expressed as provided in Table 12 by combining columns of Tables 7 and 11.

TABLE 12

| QCL of DMRS for interference and resource mapping information value of interferer cell | QCL-related notification | Resource mapping-related notification of interferer cell |
|---|---|---|
| 00 | First CSI-RS index configured with RRC information | 1. First CRS resource information configured with RRC:<br>CRS offset<br>Number of CRS antenna ports<br>MBSFN subframe information<br>2. First PDSCH start symbol information configured with RRC information |
| 01 | Second CSI-RS index configured with RRC information | 1. Second CRS resource information configured with RRC:<br>CRS offset<br>Number of CRS antenna ports<br>MBSFN subframe information<br>2. Second PDSCH start symbol information configured with RRC information |
| 10 | Third CSI-RS index configured with RRC information | 1. Third CRS resource information configured with RRC:<br>CRS offset<br>Number of CRS antenna ports<br>MBSFN subframe information<br>2. Third PDSCH start symbol information configured with RRC information |
| 11 | Fourth CSI-RS index configured with RRC information | 1. Fourth CRS resource information configured with RRC:<br>CRS offset<br>Number of CRS antenna ports<br>MBSFN subframe information<br>2. Fourth PDSCH start symbol information configured with RRC information |

Figure 14:
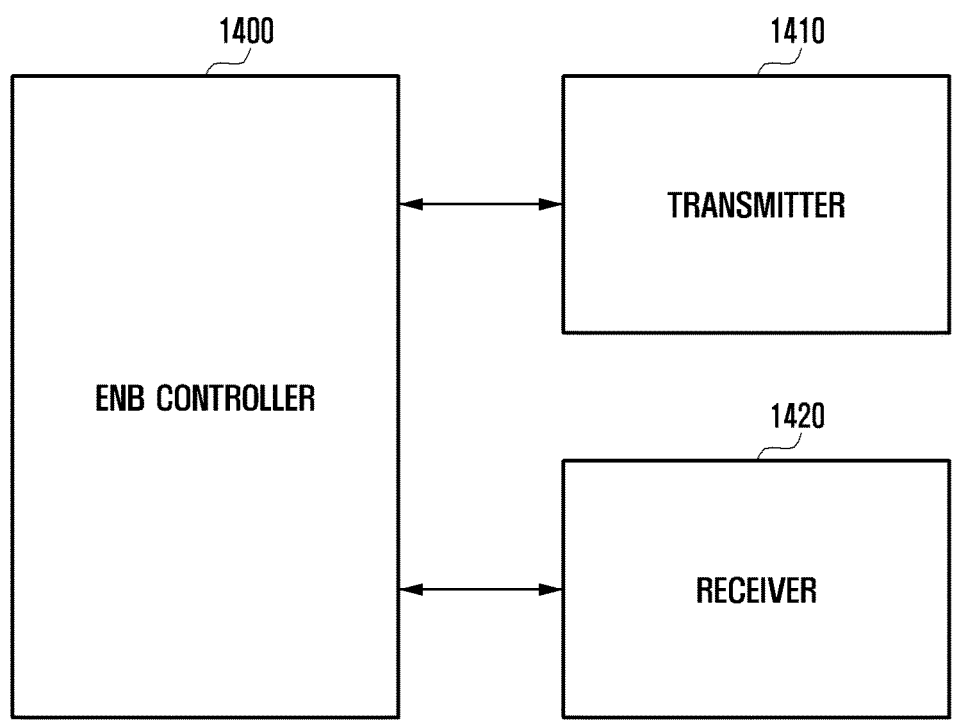
FIG. 14 is a block diagram illustrating a configuration of the eNB according to an embodiment of the present invention.

At step 1320, the UE checks the downlink control information transmitted on PDCCH in the actual PDSCH, reads resource mapping information of the interferer cell which is FIG. 14 is a block diagram illustrating a configuration of the eNB according to an embodiment of the present invention.

Referring to FIG. 14, the eNB controller 1400 determines IAD configuration of the UE, PDSCH scheduling, interferer cell configuration for a specific UE, and corresponding CSI-RS and CRS information. The IAD configuration of the UE which is determined by the eNB is notified to the UE by means of the transmitter 1410. According to the PDSCH scheduling decision of the eNB, PDCCH/ePDCCH and PDSCH are transmitted to the UE by means of the transmitter 1410. The eNB transmits PDCCH and receives channel state information based on the IAD configuration of the UE by means of the receiver 1420.

Figure 15:
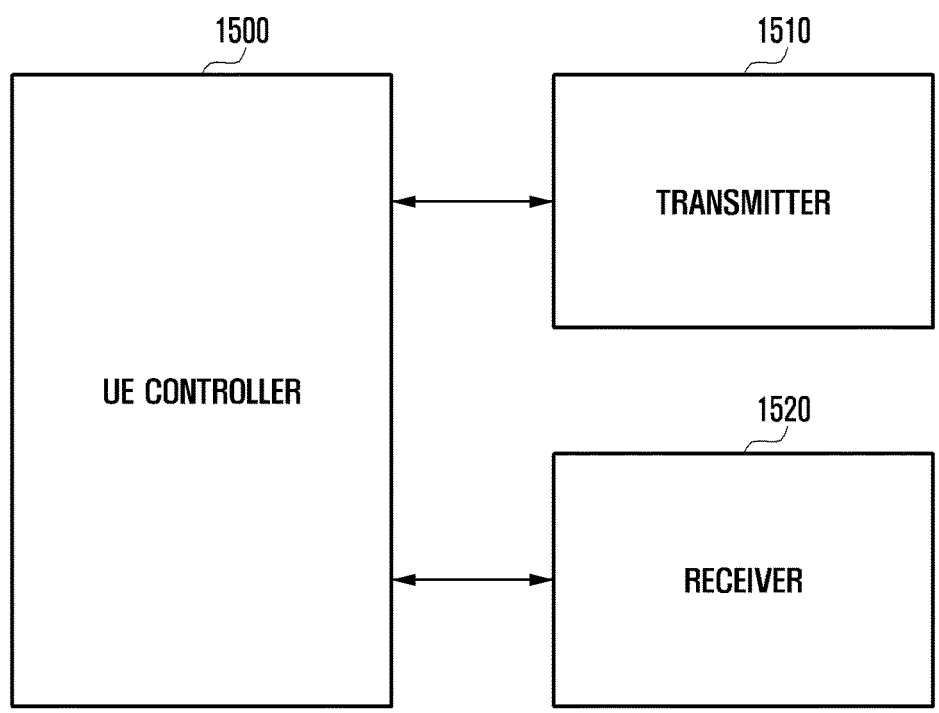
FIG. 15 is a block diagram illustrating a configuration of the UE according to an embodiment of the present invention.

FIG. 15 is a block diagram illustrating a configuration of the UE according to an embodiment of the present invention.

Referring to FIG. 15, the UE controller 1500 receives the control information on the IAD configuration from the eNB by means of the receiver 1520 to check the radio resource for use in interference measurement, QCL information of interference DMRS for specific PDSCH scheduling, and resource mapping information of the interference cell. The receiver 1520 performs decoding on the PDCCH/ePDCCH in order for the UE controller 1500 to determine the scheduling information of the PDSCH. The UE may acquire the control information related to IAD from the information notified through the PDCCH/ePDCCH.

As described above, the interference control method and apparatus of the present invention is advantageous in that the UE is capable of mitigating interference based on the interference information so as to improve communication efficiency in the wireless communication system.

It is to be appreciated that those skilled in the art can change or modify the embodiments without departing the technical concept of this invention. Accordingly, it should be understood that above-described embodiments are essentially for illustrative purposes only but not in any way for restriction thereto. Thus the scope of the invention should be determined by the appended claims and their legal equivalents rather than the specification, and various alterations and modifications within the definition and scope of the claims are included in the claims.

Although the description has been made with reference to particular embodiments, the present invention can be implemented with various modifications without departing from the scope of the present invention. Thus, the present invention is not limited to the particular embodiments disclosed but will include the following claims and their equivalents.

What is claimed is:

1. A method by a base station of a mobile communication system, the method comprising:
   identifying downlink control information including first information related to scheduling data, second information on a second reference signal of a cell associated with the base station being quasi co-located with a first reference signal of an interference signal, and third information on a scrambling sequence of the first reference signal of the interference signal; and
   transmitting, to a terminal, the identified downlink control information,
   wherein the first reference signal of the interference signal comprises a demodulation reference signal (DMRS) of the interference signal, and
   wherein the second reference signal of the cell associated with the base station further comprises at least one of a channel status information reference signal (CSI-RS) and a cell-specific reference signal (CRS).

2. The method of claim 1, wherein the downlink control information comprises information related to a modulation scheme of the interference signal and information on a layer of the first reference signal of the interference signal.

3. The method of claim 1, wherein the downlink control information comprises an indicator related to interference cancellation, and
   wherein the terminal is configured to receive the data based on the second information if the downlink control information includes an indication related to interference cancellation.

4. A method by a terminal in a wireless communication system, the method comprising:
   receiving, from a base station, downlink control information including first information related to scheduling data, second information on a second reference signal of a cell associated with the base station being quasi co-located with a first reference signal of an interference signal, and third information on a scrambling sequence of the first reference signal of the interference signal; and
   receiving, from the base station, the data based on the downlink control information,
   wherein the first reference signal of the interference signal comprises a demodulation reference signal (DMRS) of the interference signal, and
   wherein the second reference signal of the cell associated with the base station further comprises at least one of a channel status information reference signal (CSI-RS) and a cell-specific reference signal (CRS).

5. The method of claim 4, wherein the downlink control information comprises information related to a modulation scheme of the interference signal and information on a layer of the reference signal of the interference signal.

6. The method of claim 4, wherein the receiving, from the base station, the data comprises:
   receiving, if the downlink control information comprises an indicator related to interference cancellation, the data based on the second information.

7. A base station in a mobile communication system, the base station comprising:
   a transceiver configured to transmit and receive at least one signal; and
   a controller coupled with the transceiver and configured to:
   identify downlink control information including first information related to scheduling data, second information on a second reference signal of a cell associated with the base station being quasi co-located with a first reference signal of an interference signal, and third information on a scrambling sequence of the first reference signal of the interference signal, and
   transmit, to the terminal, the identified downlink control information,
   wherein the first reference signal of the interference signal comprises a demodulation reference signal (DMRS) of an interference signal, and
   wherein the second reference signal of the cell associated with the base station further comprises at least one of a channel status information reference signal (CSI-RS) and a cell-specific reference signal (CRS).

8. The base station of claim 7, wherein the downlink control information comprises information related to a modulation scheme of an interference signal and information on a layer of the reference signal of the interference signal.

9. The base station of claim 7, wherein the downlink control information comprises an indicator related to interference cancellation, and wherein the terminal is configured to receive the data based on the second information if the downlink control information includes an indication related to interference cancellation.

10. A terminal in a mobile communication system, the terminal comprising:
- a transceiver configured to transmit and receive at least one signal; and
- a controller coupled with the transceiver and configured to:
  - receive, from a base station, downlink control information including first information related to scheduling data, second information on a second reference signal of a cell associated with the base station being quasi co-located with a first reference signal of an interference signal, and third information on a scrambling sequence of the first reference signal of the interference signal, and
  - receive, from the base station, the data based on the downlink control information,
- wherein the first reference signal of the interference signal comprises a demodulation reference signal (DMRS) of the interference signal, and
- wherein the second reference signal of the cell associated with the base station further comprises at least one of a channel status information reference signal (CSI-RS) and a cell-specific reference signal (CRS).

11. The terminal of claim 10, wherein the downlink control information comprises information related to a modulation scheme of the interference signal and information on a layer of the reference signal of the interference signal.

12. The terminal of claim 10, wherein the controller is further configured to receive, if the downlink control information comprises an indicator related to interference cancellation, the data based on the second information.

* * * * *